United States Patent [19]

Anderson

[11] Patent Number: 4,617,838
[45] Date of Patent: Oct. 21, 1986

[54] VARIABLE PRELOAD BALL DRIVE

[75] Inventor: William J. Anderson, North Olmsted, Ohio

[73] Assignee: Nastec, Inc., Cleveland, Ohio

[21] Appl. No.: 597,609

[22] Filed: Apr. 6, 1984

[51] Int. Cl.[4] ............................................. F16H 13/06
[52] U.S. Cl. ........................................ 74/798; 74/202; 74/206
[58] Field of Search ................. 74/798, 198, 202, 206, 74/796

[56] References Cited

U.S. PATENT DOCUMENTS

| | | | |
|---|---|---|---|
| 1,686,446 | 10/1928 | Gilman | 74/796 |
| 2,874,592 | 2/1959 | Oehrli | 74/796 |
| 2,875,646 | 3/1959 | Bucalo | 74/798 |
| 3,080,029 | 3/1963 | Stober | 74/198 |
| 3,237,468 | 3/1966 | Schottler | 74/198 |
| 3,248,960 | 5/1966 | Schottler | 74/198 |
| 3,254,546 | 6/1966 | Nasvytis | 74/798 |
| 3,287,986 | 12/1966 | Nasvytis | 74/204 |
| 3,327,566 | 6/1967 | Hewko | 74/798 |
| 3,367,214 | 2/1968 | Nasvytis | 74/798 |
| 3,433,099 | 3/1969 | Nasvytis | 74/798 |
| 3,707,888 | 1/1973 | Schottler | 74/796 |

FOREIGN PATENT DOCUMENTS

| | | | |
|---|---|---|---|
| 559523 | 7/1958 | Canada | 74/798 |
| 3215923 | 11/1983 | Fed. Rep. of Germany . | |
| 1022892 | 3/1953 | France | 74/798 |
| 1120638 | 7/1956 | France | 74/798 |
| 0025969 | 2/1977 | Japan | 74/198 |
| 0636437 | 12/1978 | U.S.S.R. | 74/798 |
| 0785570 | 12/1980 | U.S.S.R. | 74/798 |

*Primary Examiner*—Kenneth J. Dorner
*Assistant Examiner*—David Novais
*Attorney, Agent, or Firm*—Body, Vickers & Daniels

[57] ABSTRACT

A traction ball drive of the type having torque ball driven split inner races drivingly connected to an output shaft wherein a plurality of preload balls retained in variable depth arcuate grooves formed the opposed annular surfaces of one of the inner races and a pre-load ring, slidably keyed to the output shaft and resiliently loaded by a disk spring, provide preloading on the torque balls with the preload balls traversing the grooves responsive to torque variations to establish the required dynamic loading between the inner races and the torque balls.

8 Claims, 4 Drawing Figures

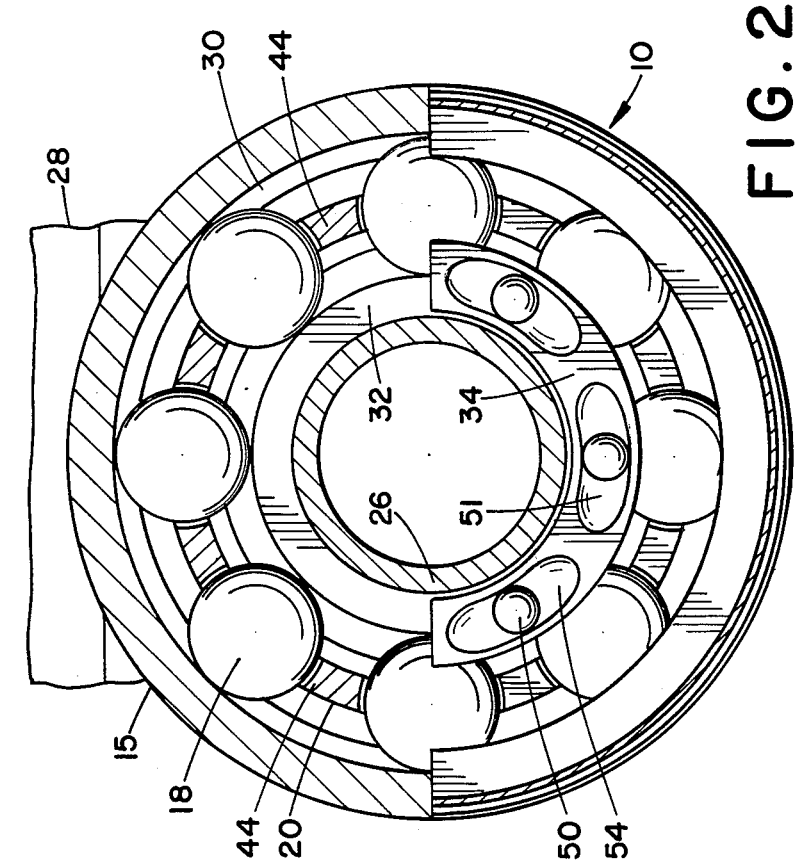
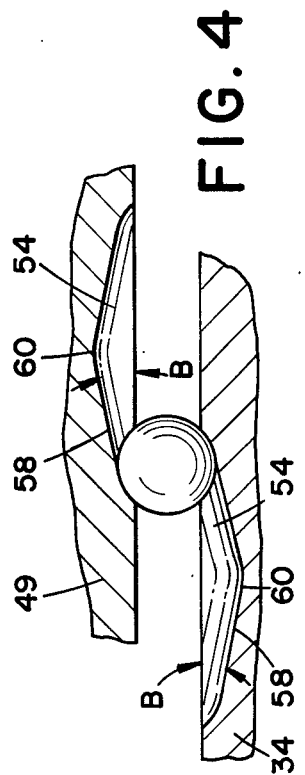
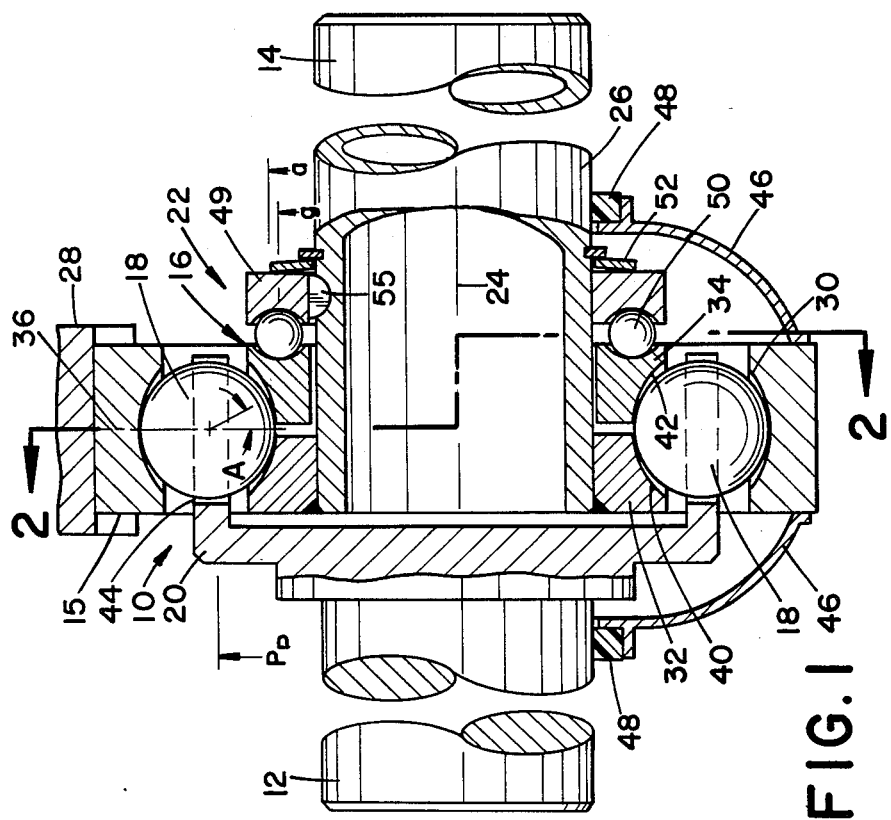
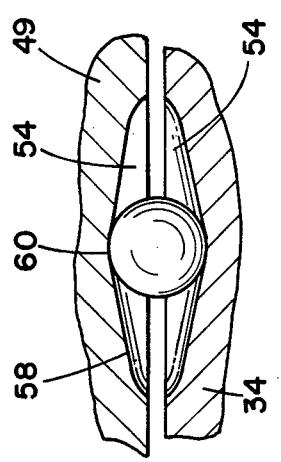

VARIABLE PRELOAD BALL DRIVE

The present invention relates to ball-type traction drives and, in particular, to a variable preload ball drive providing only sufficient ball race loading such that input torque can be transmitted without slip thereby minimizing friction losses and maximizing drive efficiency under varying operating conditions.

The invention is particularly directed to a step-up ratio ball drive wherein an input shaft or spider drives a plurality of torque balls with respect to a fixed outer race and a rotatable inner race to thereby drive the inner race and coupled output shaft at an increased rate of speed, although it will be appreciated that the drive could be reversed to function as a speed reducer or that the fixed race member could also be reversed.

Ball-type traction drives have numerous advantages over other transmission devices such as gears, pulleys, etc., particularly where noise, space limitations and vibration provide operating constraints.

Also, where the output device performs more efficiently at higher speeds than normally or intermittently provided by the input shaft, such as generators, air conditioners, and power assist devices for motor vehicles, a speed ratio increase is necessary for satisfactory performance. These features are conveniently attainable in ball type drives where, within the general confines of a ball bearing unit, speed increase, low vibration and noise and torque requirements can be satisfied. In such ball drives, the ratio of the output speed to the input speed depends on the diameter of the torque balls, the pitch diameter of the torque balls, and the contact angle between the center plane of the torque balls and center of the ball race contact area. In this connection, it is desirable to make the contact angle as small as possible so as to minimize the race loading to transmit a needed torque at maximum power. Drive loading is conventionally provided by radially splitting one of the race members, one part of which is then directly coupled to the output and the other of which is circumferentially coupled to the output and axially biased by a spring system against the race to thereby provide the necessary torque ball loading for the torque demands of the driven unit. For applications having widely varying operating and intermittent maximum power requirements, such as the aforementioned applications, it is advantageous to maintain the axial loading just sufficiently high to allow transmission of the maximum torque without slipping. This results in the need for a method of varying the level of axial loading. Without a variable preload system, the level of loading would be excessively increasing friction losses, and adversely raising the temperature of the traction fluid with a resultant lowering of overall drive efficiency.

BRIEF SUMMARY OF THE INVENTION

Accordingly, it is an object of the present invention to provide a ball-type traction drive having a variable preloading which applies just sufficient ball race loading such that the input torque can be transmitted without slip for all operating torque variations.

In accordance with the present invention, the inner race of the ball drive is radially split into two halves at the inner raceway. One half is directly coupled to the output shaft. The other half is the preloading race member and is rotatably and slidably movable with respect to the first half. A preload ring is axially slidably keyed to the output shaft. A plurality of arcuate variable depth grooves are formed in opposed axial surfaces of the preload ring and the preloading race member. A circumferential series of preload balls are retained in the grooves. A constant force disc spring biases the preload ring through the preload balls against the preloading race member into a predetermined level of initial preloading engagement with the torque balls.

The spring provides a low level of initial axial loading required to prevent looseness in the drive. At no-load condition, the preload balls are at the bases of the grooves and the spring establishes the preload. As the applied torque increases, a torque balance is established with the preload balls resulting in an increased axial loading on the torque balls. This causes elastic compression at the torque ball interface resulting in sufficient contact to transmit the applied torque without slippage. To accommodate the compression, the balls ride up the groove ramps thereby increasing the axial separation between the preloading inner race member and the preload ring thereby maintaining continuous driving contact. As the torque varies, the balls traverse the ramps to meet the prevailing torque and loading demands. The ramp angle of the grooves is designed to establish the above-mentioned torque balance between the torque ball and the preloading inner race member with the torque transmitted through the preload balls for a predetermined contact angle and drive component relationship. The ramp has sufficient circumferential length to handle the axial compression. The grooves have bidirectionally inclined ramps for handling load reversal conditions.

With this arrangement, the ball race loading is continuously adjusted in view of the prevailing torque requirements. This lower loading results in a lesser frictional loss with a consequent lowering of traction fluid operating temperatures and an improvement in the operating drive efficiency.

BRIEF DESCRIPTION OF THE DRAWING

The above and other advantages of the present invention will become apparent to those skilled in the art upon reading the following specification with reference to the accompanying drawings in which:

FIG. 1 is a side elevational view of a variable preload ball drive made in accordance with the present invention;

FIG. 2 is a cross-sectional view taken along line 2—2 in FIG. 1;

FIG. 3 is a developed view taken along line 3—3 of FIG. 2 under minimum load conditions; and, FIG. 4 is a view similar to FIG. 3 under maximum load conditions.

DETAILED DESCRIPTION OF THE INVENTION

Referring to the drawings for the purposes of illustrating the preferred embodiment of the invention only, and not for the purpose of limiting the same, FIG. 1 shows a variable preload ball drive 10 for transmitting power from an input drive 12 to an output drive 14.

The input drive device 12 may have a variable speed device such as a motor vehicle engine. The output drive device 14 may be coupled to a variable speed, variable power demand device such as an air conditioner, alternator or power assist device.

The ball drive 10 generally comprises an outer race 15, an inner race assembly 16, a circumferential series of torque balls 18, a spider 20 and a preload assembly 22, all of which are concentrically disposed with respect to a rotational axis 24.

The input spider 20 is drivingly connected to the input drive device 12. The inner race assembly 16 and the preload assembly 22 are drivingly connected to an output shaft 26 coupled to the output drive device 14. The spider 20 drives the torque balls 18 in planetary movement with respect to the outer race 15, fixed to a frame member 28. to thereby drive the inner race assembly 16 at a constant ratio increase in speed. The variable preload assembly 22 cooperates with inner race assembly 16 as hereinafter noted to provide for variable loading of the torque balls 18.

The outer race 15 is generally cylindrical and has an outer cylindrical surface fixedly received within a corresponding bore in the frame member 28 by any suitable means not shown here in detail. An annular raceway 30 is formed in the inner cylindrical surface of the outer race 15. The radius of the raceway 30 is slightly larger than the radius of the torque balls 18.

The inner race assembly 16 is a torque dividing two-piece construction having a fixed race 32 fixedly connected to the outer end of the drive shaft 26 and a loading race 34 rotatably supported by the outer surface of the drive shaft 26 and axially movable with respect to fixed race 32 under the action of the variable preload assembly 22. The races 32 and 34 are substantially symmetrically disposed with respect to a plane 36 through the center of the torque balls 18. The race 32 has an annular outwardly facing raceway 40. The race 34 has an annular outwardly facing raceway 42. The raceways 40 and 42 have a radius slightly larger than the radius of the torque balls 18. The plurality of torque balls 18 are retained within the generally toroidal cavity formed by the raceways 30, 40 and 42.

Housing and sealing members, 46 and 48, enclose the ball drive 10 with the spider 20 and the shaft 26. A suitable traction drive lubricant is retained within the housing members and, in a conventional manner, provides lubrication between the relatively moving parts and the desired traction coefficient between the torque balls 18 and the raceways 40 and 42.

The torque balls 18 are substantially equally circumferentially spaced by axially projecting drive arms 44 formed on the spider 20. The drive arms 44 have opposed curvilinear surfaces defining cylindrical or spherical pockets for retaining and driving the torque balls 18.

The center of contact between the surfaces of the arms 44 and the torque balls 18 prescribes a pitch diameter (PD) for driving the balls with respect to the races. The annular space between the loaded race member 32 and the loading race member 34 allows relative axial movement therebetween to establish circumferential contact between the raceways 40 and 42 at a contact angle A. It is desired to make the contact angle between the plane 36 a line drawn through the center of the ball race contact area, the Hertz ellipse, as small as possible. This minimizes the axial force necessary to maintain no slip torque transmission throughout the operating ranges. The minimum contact angle A would be the value which allows the edge of the Hertz contact ellipse to touch but not overlap the axial inner edge of the associated raceway.

In a conventional manner, the ratio of the output speed to the input speed is a function of the pitch diameter PD, the diameter of the torque balls 18 and the contact angle A. This ratio is typically in the range of 2.5:1 to 4:1 for pitch diameter/ball diameter ratios of around 2 to 4. While this is an essentially constant ratio, as the loading between the ball and inner races increases the contact area also increases, and the contact angle A may change very slightly resulting in a slight change in drive ratio.

The preload assembly 22 provides the means for variably axially loading the torque balls to establish the desired contact areas which are generally slightly in excess of that required to transmit the torque under the varying load demands of the output device 14. More specifically, in addition to the loading race 34, the preload assembly 22 comprises a preload ring 49 a plurality of preload balls 50 and a disc spring 52.

The preload balls 50 are individually retained within variable depth arcuate grooves 54 formed in opposed surfaces of the loading race 34 and the preload ring 49. The preload ring 49 has an axial groove formed in the inner circumferential portion thereof which is axially slidably disposed with respect to a key 55 fixed to the outer surface of the drive shaft 26. Accordingly, the preload ring is free to move axially with respect to the movable raceway 34 but is circumferentially restrained by the key and groove arrangement.

The disc spring 52 is a belville type spring. This has the advantage of minimal axial space requirements for the required loading. The spring 52 is fully compressed and retained at its outer portion by the outer axial surface of the preload ring 49 and at its inner portion by an annular snap ring 56 which is retained in the outer surface of the drive shaft 26. The spring force may be beneficially in the range of 10-30 percent of the maximum loading requirement, depending of course on the application demands.

Referring to FIGS. 2-4, the plurality of grooves 54 (six in this case) are circumferentially evenly spaced about the associated axial surface. The grooves 54 have ramps 58 bidirectionally inclined with resoect to a central base 60. The grooves 54 have a radius slightly greater than the radius of the preload balls 50. In a no-load or minimal load position, the movable loading race 34 and the preload ring 49 are circumferentially oriented with respect to one another and the balls reside at the bottom of the ramps. The axial spacing between the members is at a minimum. In this condition, the disc spring applies the axial force between the members. As the driving torque increases, a torque balance is established between the loading race 34 and the torque balls 18, and the loading race 34 and the preload balls 50 at their respective pitch diameters and contact angles. This increases the axial loading on the torque balls, resulting in elastic compressive deformation on the components, particularly at the torque ball-inner race interfaces thereby increasing the contact area sufficient to handle the prevailing torque without slippage. This compression is compensated by the balls 50 rolling up the ramps 55 further separating the race 34 and the ring 49 while maintaining the loading and uninterrupted driving rolling contact. Upon load reversal, the preload balls 50 traverse the grooves 54 in the opposite direction to meet the prevailing torque requirements. At the maximum torque, the balls 50 are adjacent the shallow end of the grooves 54. The axial deflection of the ring progressively increases the axial loading at the torque balls.

The ramp angle for achieving these relationships can be calculated from the following formula:

$$\tan B = \frac{t \cdot a}{g \cdot \sin A}$$

where B is the ramp angle, t is the traction coefficient between the torque balls and the inner raceway, A is the contact angle, a is the inner race diameter at the contact angle, and g is the pitch diameter of the preload balls.

It is preferred to assume a slightly conservative value for the traction coefficient and the contact angle for efficient driving under the varying operative and manufacturing conditions. The circumferential length of the preload ball ramp is sufficient to provide the axial deflection necessary to develop the required axial force between the halves of the inner race under maximum torque conditions. The concavity of the ramps 61 is closely matched to the preload balls 50 to prevent overstressing the preload balls under maximum torque conditions.

The axial gap between the races 32 and 34 is greater than the axial displacement between no-load and fully loaded conditions. However, to keep the profile as compact as possible, the no-load gap will allow for almost complete seating of the balls in the grooves. The length of the ramps will be sufficient to handle the resulting axial compression. The number and diameter of the preload balls depends on the axial force that must be developed at full load. Typically, the maximum Hertz stress between the preload balls and the ramps should be kept below about 300,000 psi.

With specific reference to the preload grooves, it is apparent that the same may take various forms for providing the compactness, responsiveness and load capabilities consistent with the above operational benefits. For instance, rather than a constant angle ramp the same may be profiled to correspond more fully with a dynamic torque requirement. The grooves may also have an increasing or decreasing operative pitch diameter under loading.

By way of example, a variable preload ball drive has eight, one inch balls, evenly circumferentially spaced about the raceways and driven by the spider at a pitch diameter of 4.13 inches. The radius of the raceways is 0.52 inches and establishes contact angle of 18°. The drive handles a maximum torque at the spider of one-hundred foot pounds at 1200 rpm. The total axial force developed at maximum torque is 2912 pounds. Six ⅜" diameter balls are retained within the preload grooves. The grooves have a ramp angle of 12° and spanned an arcuate sector of approximately 50° at a diameter 2.750 inches. The spring 52, when deflected flat, develops an axial force of approximately 600 lbs. The total axial deflection of the loading races is 0.020 at maximum torque. The initial torque ball preload is 242 pounds. The maximum ball loading is 1178 pounds. The preload ball drive can handle up to 50 horsepower without slippage.

The above invention has been described with respect to the speed increasing ball drive, it will be apparent that by reversal of the input drive the ball drive will function effectively as a speed reducer, while providing the above-mentioned advantages of the invention. Further, the outer race may be split and function as the output drive.

While the above invention has been described by reference to the preferred embodiment, obviously other modifications will occur to those skilled in the art upon reading the detailed description. Accordingly, it is intended to include all such modifications which come within the scope of the appended claims or equivalence thereof.

I claim:

1. A fixed ratio ball drive having first and second relatively rotatable shafts, each shaft operating as either an input or output shaft, a pair of concentric annular race nembers, one of said race members being fixed against rotation and defining a unitary, axially undivided raceway, the other of said race members defining a spaced facing raceway, a plurality of torque balls retained in said raceways, a drive member connected to said first shaft having means circumferentially spacing and drivingly engaging said torque balls, both of said raceways having a radius of curvature greater than said torque ball radius, said other race member consisting of first and second race rings relatively axially movable along said second shaft to compressively radially engage the torque balls at a predetermined substantially fixed contact angle, the first race ring being fixedly rotatably connected to said second shaft, the second race ring being rotatable with and axially slidable relative to said second shaft;

a preload ring carried and driven by said second shaft, said preload ring being axially spaced from and axially shiftable relative to said second race ring;

a circumferentially spaced series of circumferentially extending opposed ramp surfaces formed in opposed axial surfaces of said rings, said ramp surface being inclined at a predetermined angle relative to the radial plane of said rings;

preload balls retained between said opposed ramp surfaces establishing rolling axial driving engagement between said rings between said ramp surfaces;

spring means operative between said preload ring and said second shaft exerting an axial force on said second race ring through said preload ring and preload balls toward siad first race ring to create a frictional force between said raceways and said torque balls just sufficient to transmit minimum expected torque demands on said drive;

said predetermined angle of inclination being related to said preload balls such that an applied greater than minimum torque demand on said drive, when transmitted to said preload ring as driven by said second shaft, results in rolling movement of said preload balls between said ramp surfaces; and, said rolling movement of said preload balls providing an additional axial force in proportion to said applied torque which, with said spring force, provides a combined axial force to increase the friction between said torque balls and said raceways to a level which is sufficient to maintain rolling driving engagement therebetween at said substantially fixed contact angle.

2. The ball drive as recited in claim 1 wherein said ramp surfaces are defined by a plurality of arcuate grooves in said opposing axial surfaces of the second race ring and said preload ring.

3. The ball drive as recited in claim 2 wherein said grooves are disposed in a constant diamter circumferential series.

4. The ball drive as recited in claim 3 wherein said ramp surfaces bear a constant axial inclination.

5. The ball drive as recited in claim 4 wherein each groove comprises a pair of oppositely extending ramp surfaces.

6. The ball drive as recited in claim 1 wherein said spring means is a disc spring.

7. The ball drive as recited in claim 6 wherein said disc spring is fully compressed to exert a predetermined axial force.

8. The ball drive as recited in claim 7 wherein said predetermined axial force is less than about 20 percent of said combined axial force.

* * * * *